Figure 16:
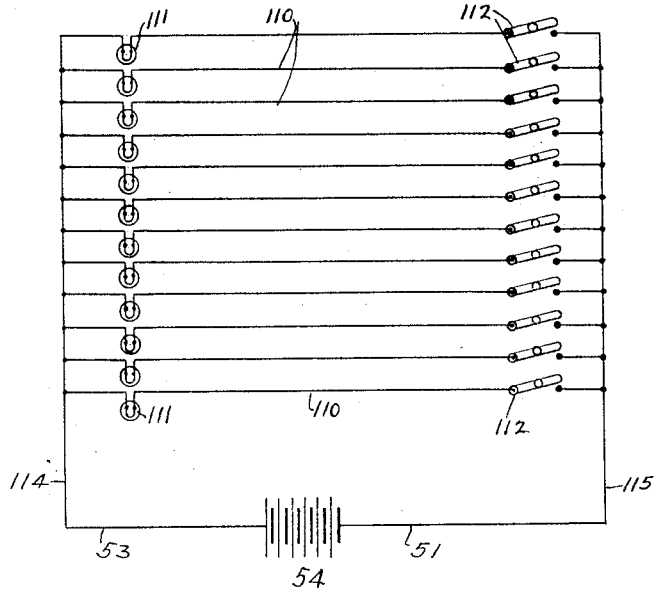

J. B. LEE.
ELECTRIC SWITCH MECHANISM.
APPLICATION FILED MAR. 21, 1911.
1,165,683.
Patented Dec. 28, 1915.
10 SHEETS—SHEET 1.
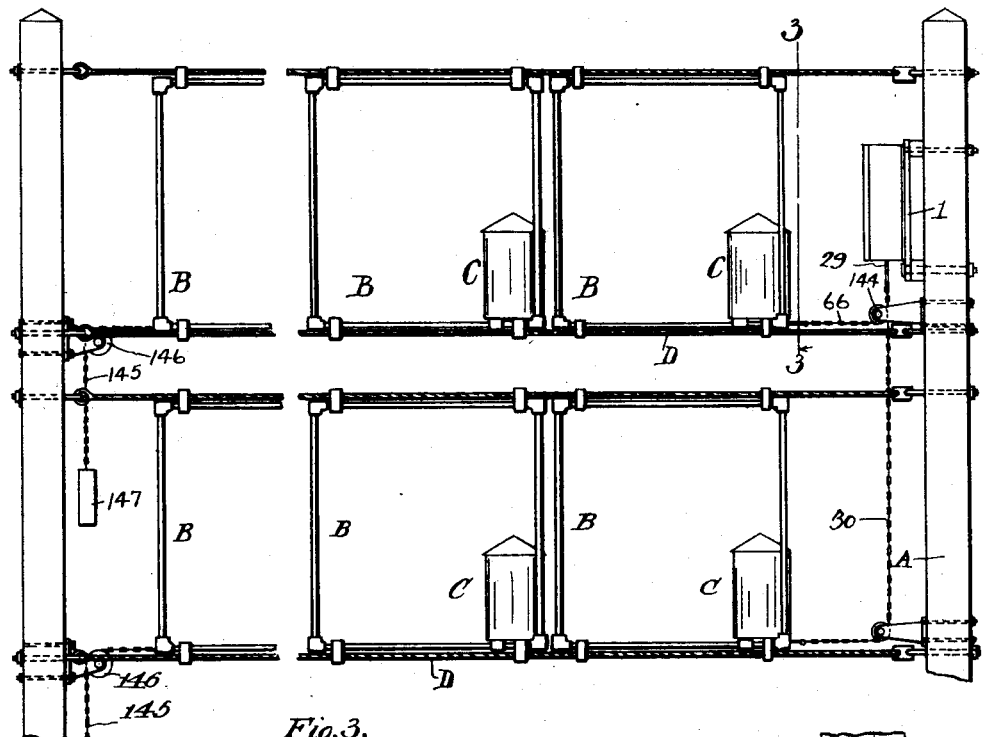
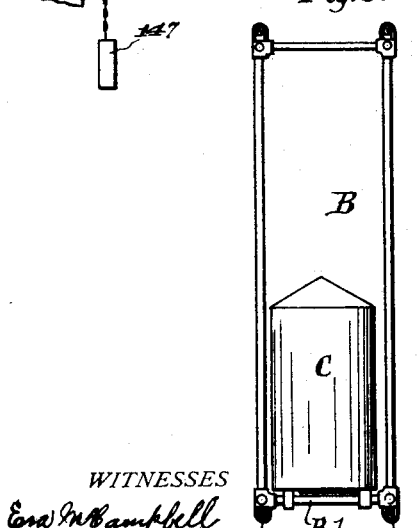
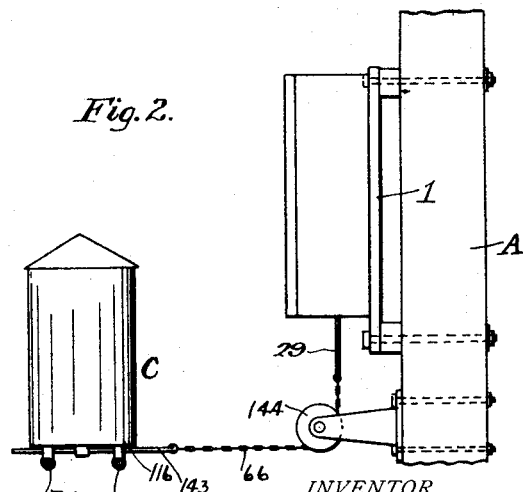

J. B. LEE.
ELECTRIC SWITCH MECHANISM.
APPLICATION FILED MAR. 21, 1911.
1,165,683.
Patented Dec. 28, 1915.
10 SHEETS—SHEET 2.
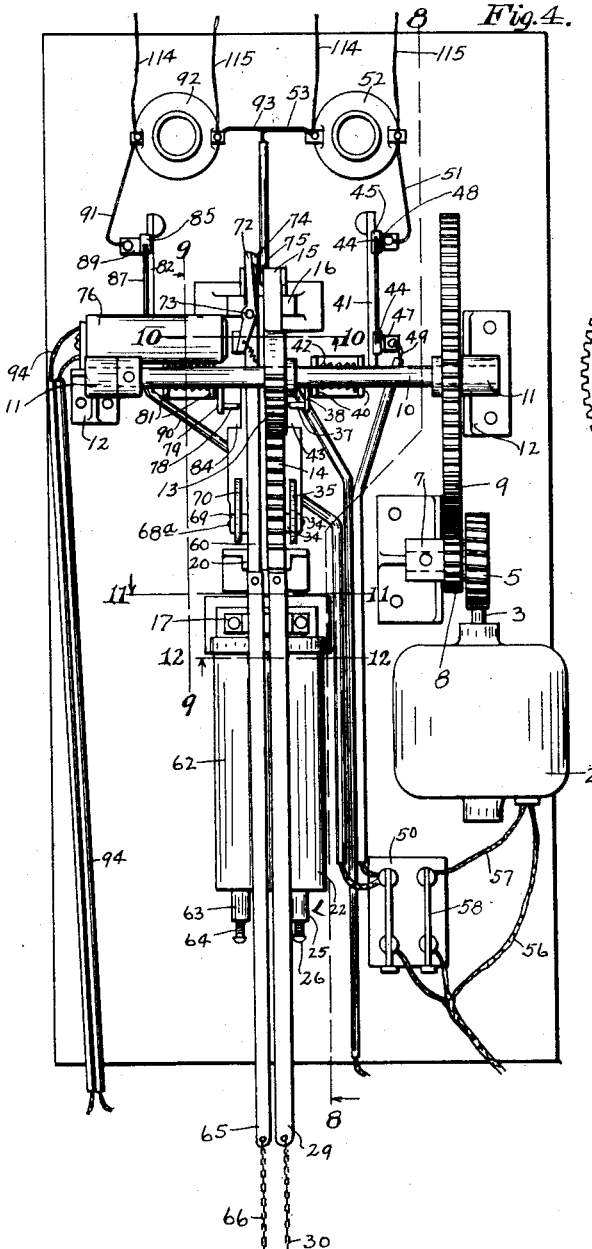
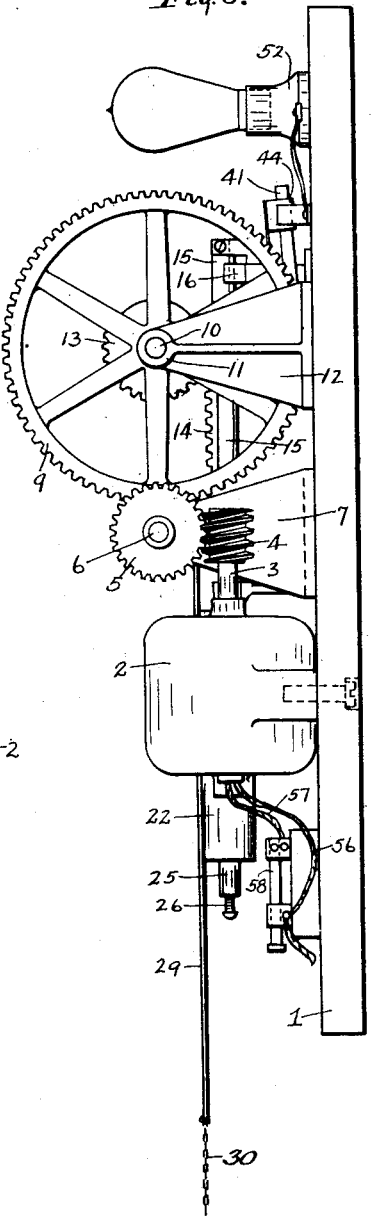
WITNESSES
INVENTOR
James B. Lee
By Cyrus Kehr
Attorney J. B. LEE.
ELECTRIC SWITCH MECHANISM.
APPLICATION FILED MAR. 21, 1911.
1,165,683.
Patented Dec. 28, 1915.
10 SHEETS—SHEET 3.
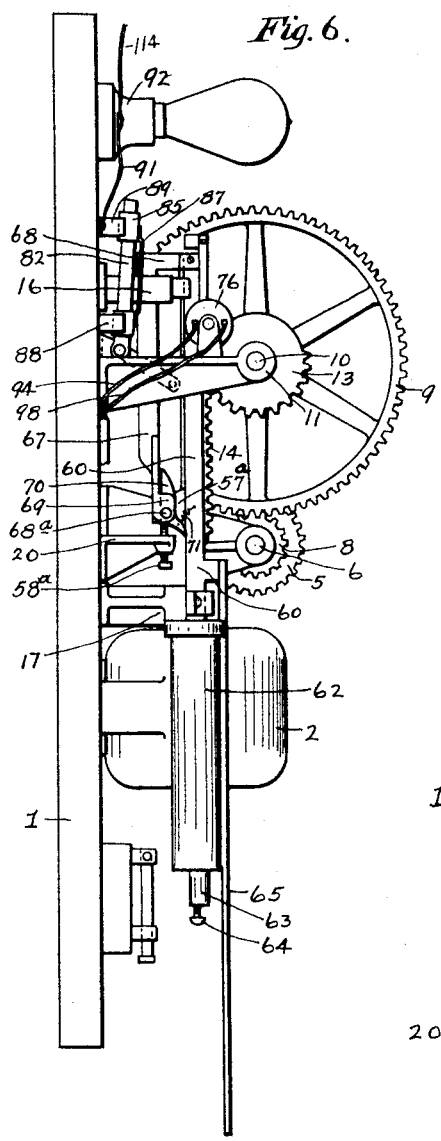
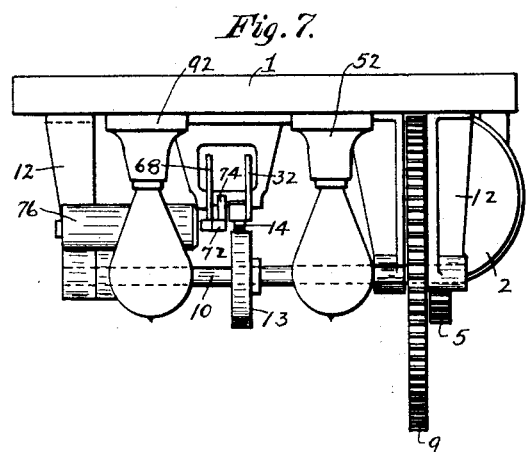
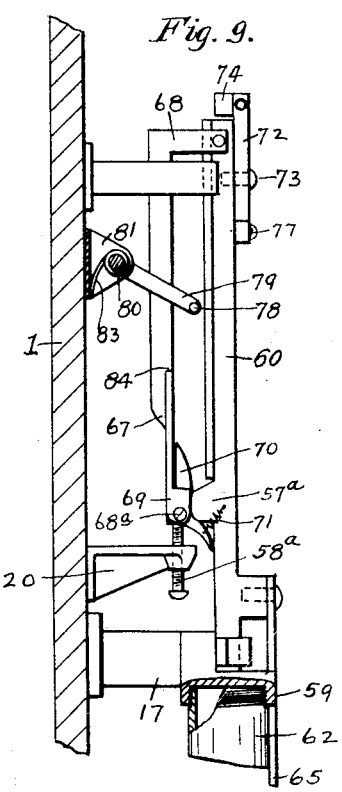
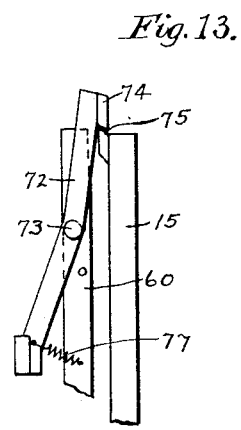
WITNESSES
Eva McCampbell
W. Wholey
INVENTOR
James B. Lee
By Cyrus Kehr
Attorney J. B. LEE.
ELECTRIC SWITCH MECHANISM.
APPLICATION FILED MAR. 21, 1911.
1,165,683.
Patented Dec. 28, 1915.
10 SHEETS—SHEET 4.
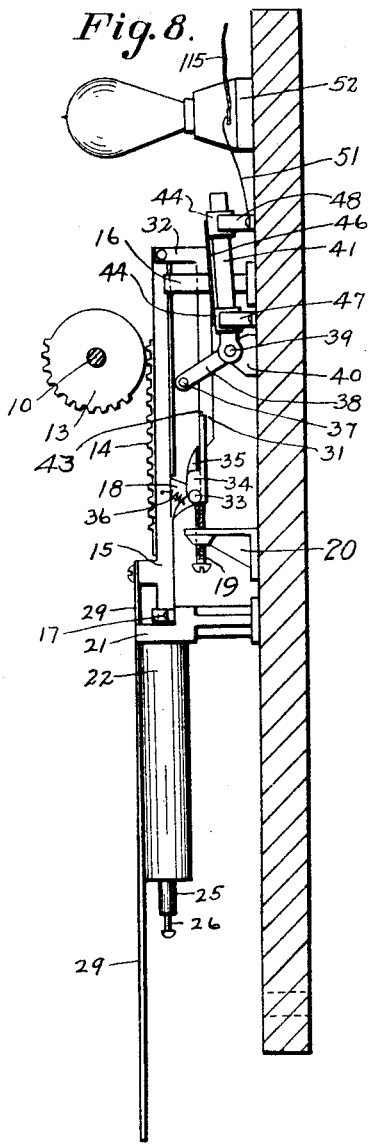
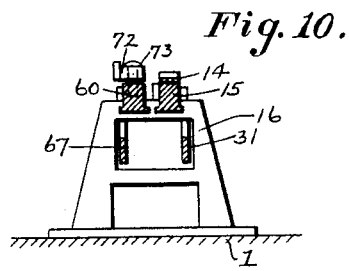
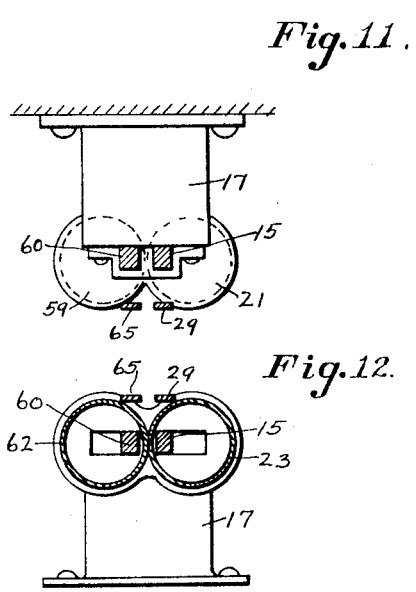
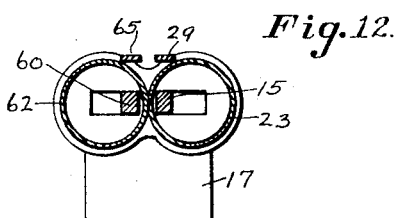
WITNESSES
Eva McCampbell
Wm Whaley
INVENTOR
James B. Lee
By Cyrus Kehr,
Attorney J. B. LEE.
ELECTRIC SWITCH MECHANISM.
APPLICATION FILED MAR. 21, 1911.
1,165,683.
Patented Dec. 28, 1915.
10 SHEETS—SHEET 5.
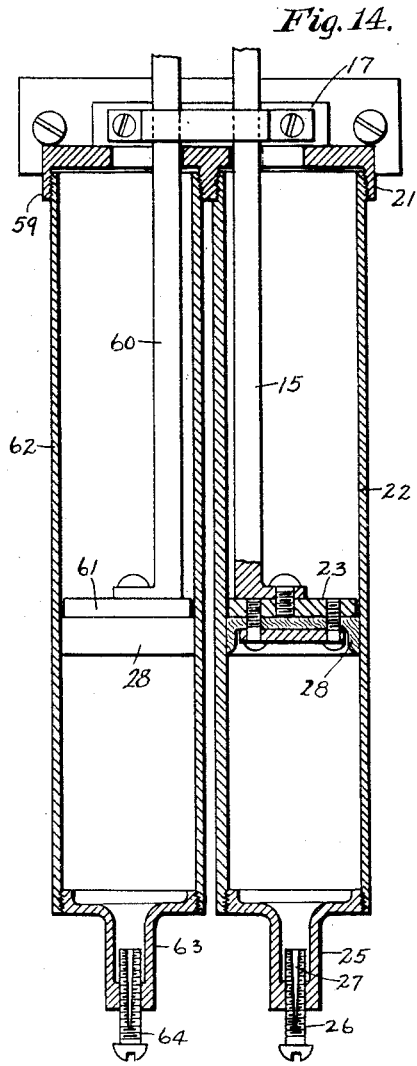
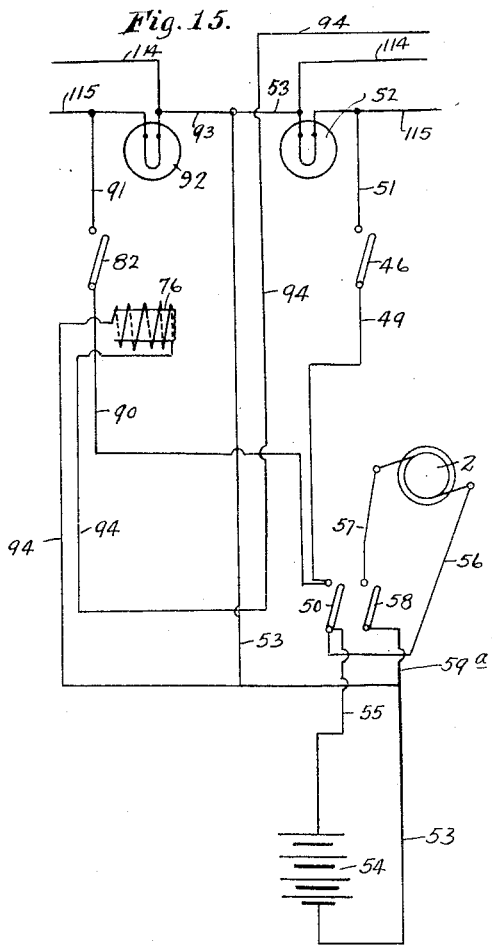
WITNESSES
INVENTOR
James B. Lee
By Cyrus Kehr
Attorney

J. B. LEE.
ELECTRIC SWITCH MECHANISM.
APPLICATION FILED MAR. 21, 1911.

1,165,683.

Patented Dec. 28, 1915.
10 SHEETS—SHEET 6.

WITNESSES
Era McCampbell
W. Whaley

INVENTOR
James B. Lee
By Cyrus Kehr,
Attorney

J. B. LEE.
ELECTRIC SWITCH MECHANISM.
APPLICATION FILED MAR. 21, 1911.
1,165,683.
Patented Dec. 28, 1915.
10 SHEETS—SHEET 7.
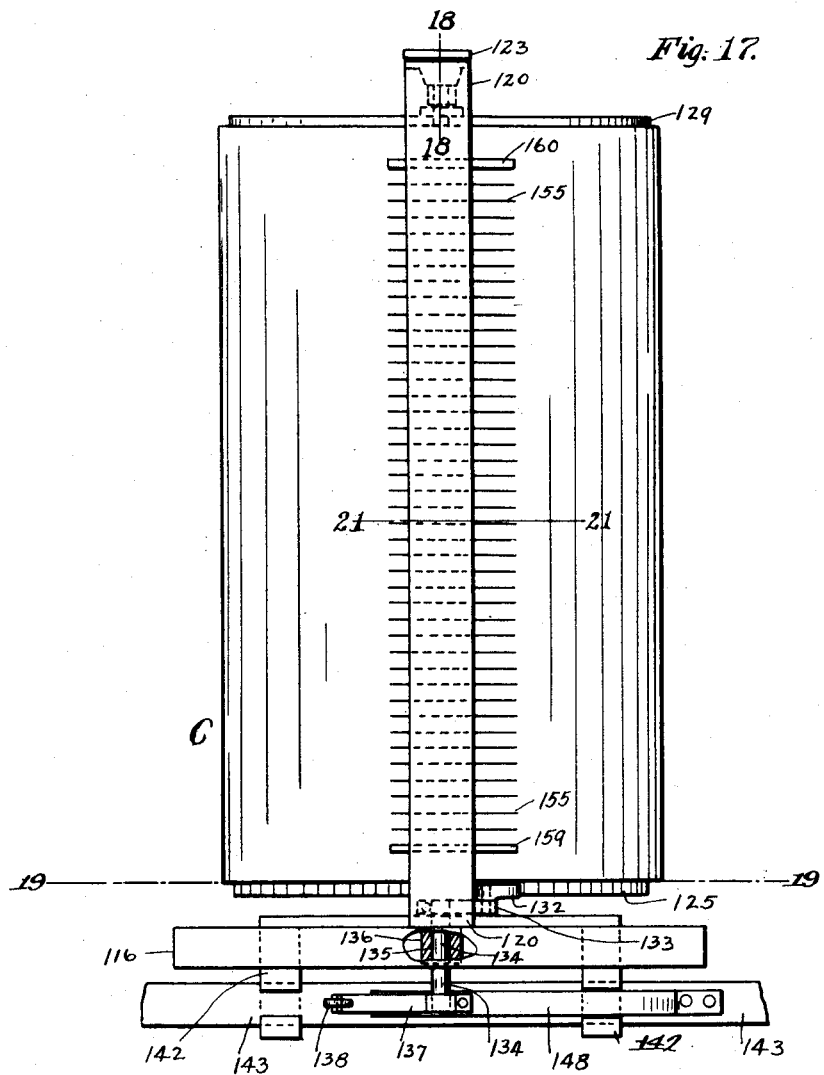
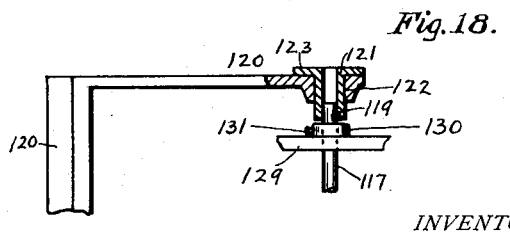
WITNESSES
Eva McCampbell
Wm Whaley
INVENTOR
James B. Lee
By Cyrus Kehr
Attorney

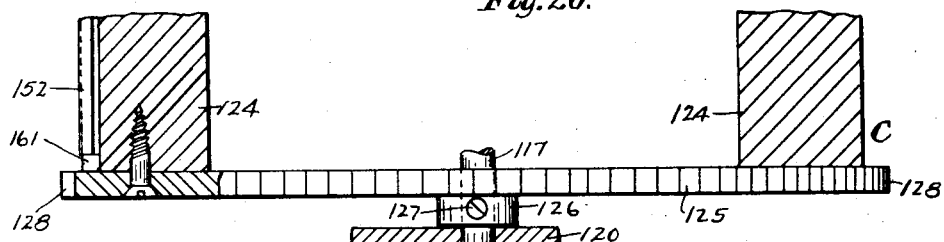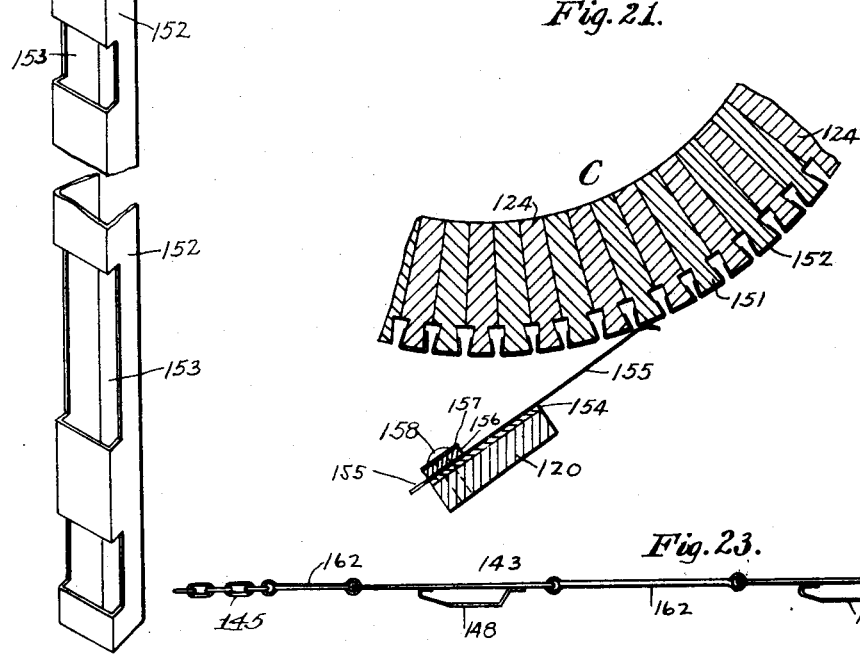

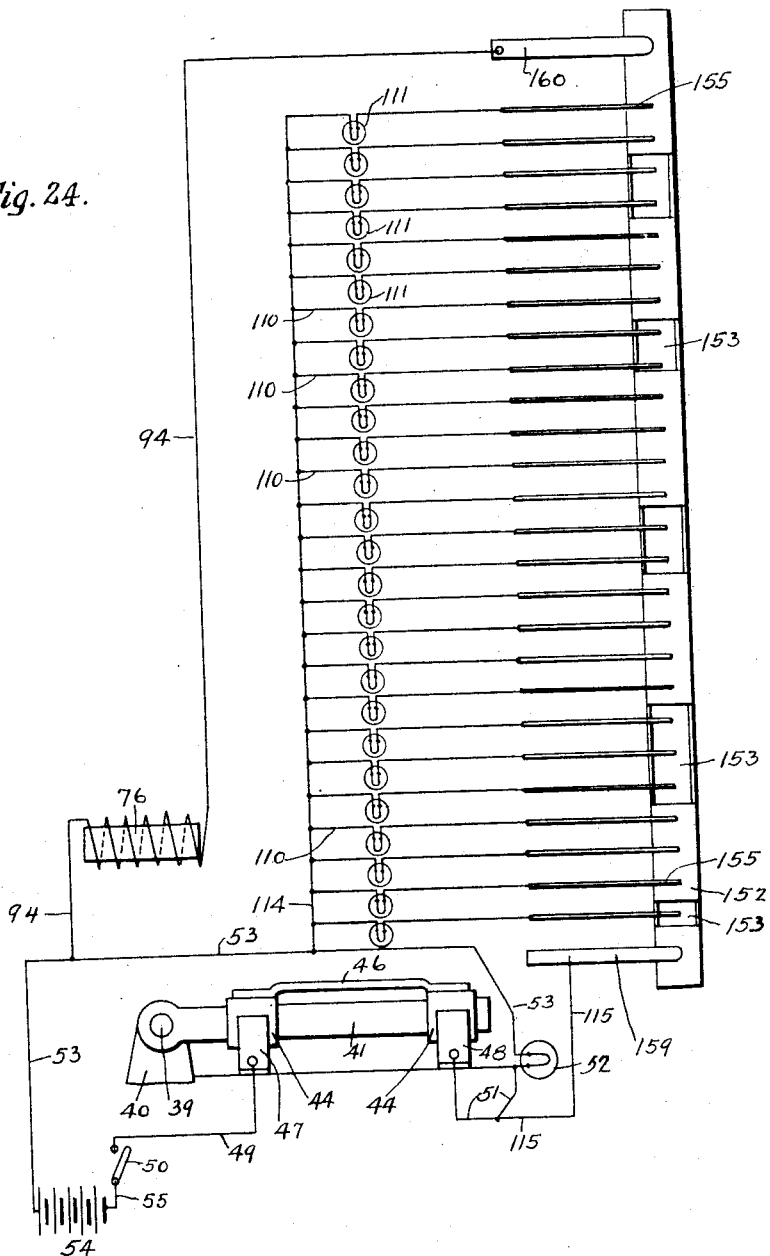

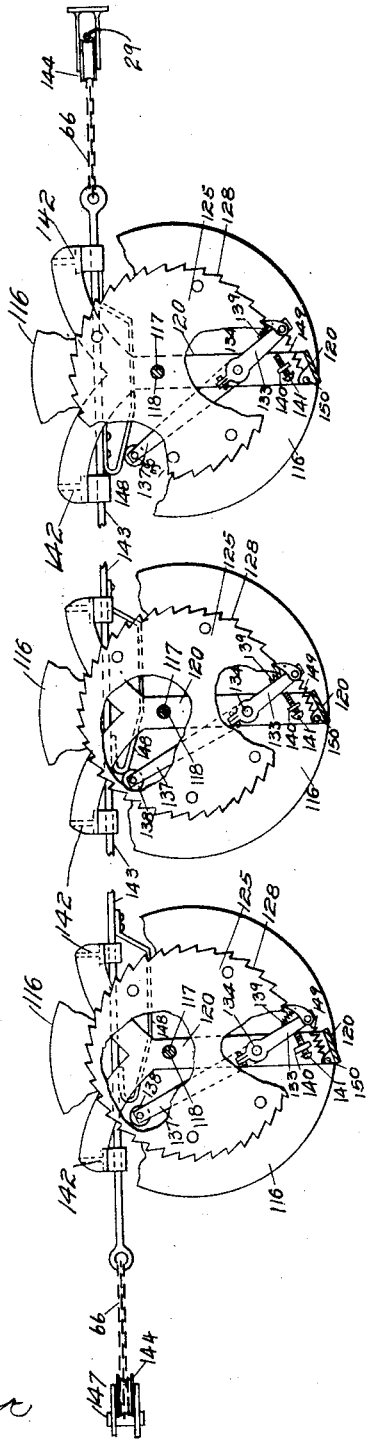

UNITED STATES PATENT OFFICE.

JAMES B. LEE, OF SAVANNAH, GEORGIA.

ELECTRIC SWITCH MECHANISM.

1,165,683.　　　　Specification of Letters Patent.　　Patented Dec. 28, 1915.

Application filed March 21, 1911. Serial No. 615,986.

*To all whom it may concern:*

Be it known that I, JAMES B. LEE, a citizen of the United States, residing at Savannah, in the county of Chatham and State of Georgia, have invented a new and useful Improvement in Electric Switch Mechanism, of which the following is a specification, reference being had to the accompanying drawing.

My improvement relates particularly to electric switch mechanism for simultaneously making or breaking a plurality of adjacent electric circuits. If, for example, twenty such circuits are located near each other, my improved apparatus may be used for simultaneously making or simultaneously breaking any one or any other number of said circuits, in order that the work to be done or controlled by said circuits may be made simultaneous for any one or for any group of said circuits, the duration of each closing being substantially the same for each conductor at that time taken into the operation. But, as a secondary feature of the invention, provision is made for the opening and closing of a portion of such circuits at intervals longer than the intervals given to the other circuits, in order that the work done by a portion of the circuits may be prolonged through a period covering several periods of work to be done by the other circuits.

For the purpose of illustration, electric lights are shown herein as the devices upon or in which the work is done. And the switch mechanism is shown and described as being driven by a driving mechanism which is a mechanism for converting motion, made the subject-matter of another application for Letters-Patent, Ser. No. 615,985, filed by me Mar. 21, 1911.

Figure 19:
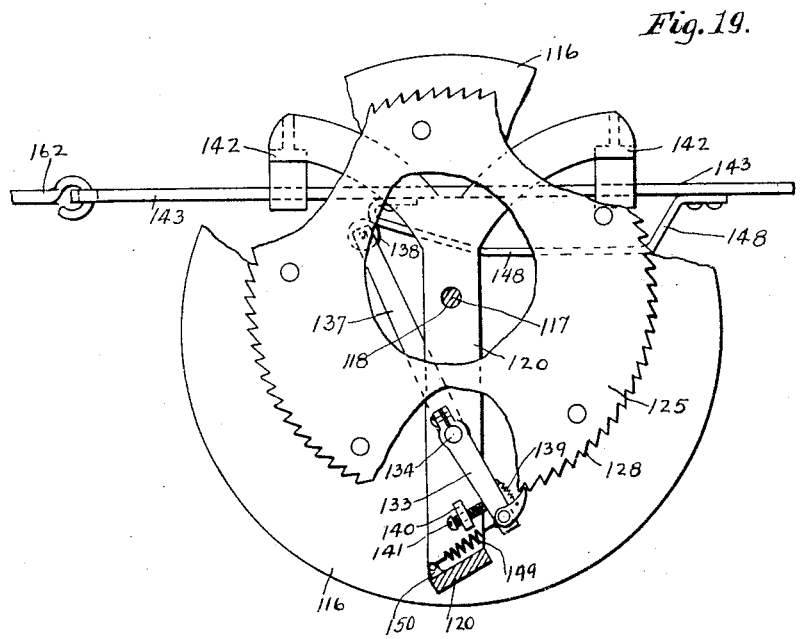

In the accompanying drawings, Figure 1 is an elevation illustrating an apparatus embodying my improvement; Fig. 2 is an enlarged detail of the mechanism shown in the upper right hand portion of Fig. 1; Fig. 3 is a section on the line 3—3 of Fig. 1, looking toward the left; Fig. 4 is a front elevation of the driving mechanism; Fig. 5 is a right hand elevation of the same mechanism; Fig. 6 is a left hand elevation of the same mechanism; Fig. 7 is a plan of the same apparatus; Fig. 8 is a section on the line 8—8 of Fig. 4; Fig. 9 is a section on the line 9—9 of Fig. 4, looking toward the right, the right, the electro-magnet being omitted; Fig. 10 is a horizontal section on the line 10—10 of Fig. 4, looking upward, the electro-magnet being omitted; Fig. 11 is a horizontal section on the line 11—11 of Fig. 4, looking downward; Fig. 12 is a horizontal section on the line 12—12 of Fig. 4, looking upward; Fig. 13 is a detail elevation of a portion of the mechanism shown by Fig. 9; Fig. 14 is a detail sectional view of the pneumatic cushion cylinders; Fig. 15 is a diagrammatic view of electric circuits used in the apparatus; Fig. 16 is a diagrammatic view of electric circuits and devices located thereon; Fig. 17 is an elevation of one of the switch mechanisms, portions being omitted; Fig. 18 is a sectional elevation on and adjacent the line 18—18 of Fig. 17; Fig. 19 is a sectional plan on the line 19—19 of Fig. 17; Fig. 20 is a sectional elevation of the lower portion of the switch mechanism; Fig. 21 is a section on the line 21—21 of Fig. 17; Fig. 22 is a detail view of one of the conductor bars; Fig. 23 is a detail plan of the tension member; Fig. 24 is a detail, partially diagrammatic elevation of a portion of the electrical mechanism forming parts of my apparatus; Fig. 25 is a sectional plan showing portions of three switch mechanisms and means for actuating the same.

Referring to said drawings, 1 is an upright base to which the working parts of the apparatus are secured. Said base is shown secured to a pole used for supporting electric signs, as hereinafter set forth. An electric motor, 2, is secured to said base with its axis upright and having on the upper end of its shaft, 3, a worm gear, 4, meshing with a worm gear wheel, 5, mounted on an axle, 6, fixed horizontally in a standard or arm, 7. Rigid with the worm gear wheel, 5, is a small spur gear wheel, 8. These two wheels may be made rigid with each other in any manner. The wheel, 8, meshes with the large gear wheel, 9, which is rigid on the horizontal shaft, 10, resting in bearings, 11, on arms, 12. Rigid on the shaft, 10, is a mutilated spur gear wheel, 13, adapted to mesh with a gear rack, 14, on an upright, primary bar, 15, slidable vertically in an upper support, 16, and a lower support, 17. On the rear of said bar is a lug, 18, adapted to bear against an upright screw, 19, standing in the path of said lug and threaded through a bracket, 20. By varying the position of said screw, the downward limit of movement of said bar may be varied. By means of this adjustment, provision may be made for proper meshing of the teeth of the mutilated wheel, 13, with the teeth of the rack. On the support, 17, is a horizontal, interiorly screw-threaded ring, 21, into which extends the exteriorly screw-threaded upper end of an upright, cylindrical, pneumatic dash-pot, 22. The primary bar, 15, extends into said dash-pot and therein supports a piston, 23. The lower end of the dash-pot terminates in a tube, 25, into which is threaded a screw, 26, having a longitudinal groove, 27, which is of increasing cross section from the head of the screw to the point thereof. Said groove makes a vent for the lower end of the dash-pot, and by turning said screw up and down in said tube, the cross section of said vent may be varied. Air is the resisting medium in said dash-pot, the piston being preferably air-tight or substantially so, during its downward movement, and the air below the piston escaping slowly through said vent. The piston, 23, is preferably formed with a downward-directed peripheral rubber or leather flange, 28, which spreads for air-tight action during downward movement and converges for the passage of air around the piston during upward movement, so that the piston may readily move upward without the creation of a partial vacuum below it and consequent air pressure resistance to upward movement. But, if the apparatus is geared for a sufficiently slow upward movement, all the air may be taken in through the vent.

Below the gear rack, 14, the upper end of a bar or link, 29, is secured to the front of the primary or main bar, 15; said link, 29, extending downward in front of and below the dash-pot, 22. A chain, 30, is attached to the lower end of said link, in any suitable manner, and by means to be hereinafter described a weight, W, is placed in operative relation with said link, 29, to draw said link and the primary bar downward when said main or primary bar, 15, is free from the mutilated gear wheel, 13. Said weight is a constantly-acting means tending to move said primary bar in the direction opposite the direction of action of the mutilated gear wheel. The direction of rotation of said mutilated gear wheel is such (clockwise when viewed from the left) as to move the teeth thereof which are adjacent said bar upward. Hence, when said bar is at its lower limit and the clear portion of said wheel is opposite the rack, 14, further rotation of said wheel will bring the teeth thereof into engagement with the uppermost teeth of said rack and cause the lifting of the latter and said bar until all the teeth of said wheel have, in turn, engaged said rack, and when the last of said teeth disengages itself from said rack, said bar is free to move downward in response to the action of the weight, W. The parts are so proportioned as that the piston, 23, will at such time be in the upper portion of the dash-pot with a relatively large volume of air between the piston and the bottom of said pot forming a relatively weak cushion—so weak that said piston bar and weight may instantly take a rapid movement which is gradually checked by the increasing density and resistance of the air between the piston and the bottom of the dash-pot. The effect of such cushion may be varied by adjustment of the screw, 26, in the tube, 25.

Associated with the main or primary bar, 15, is a rock-shaft having arms for the transmission of rocking or oscillatory motion during the first portion of the downward movement of said bar. Such first portion of the downward movement of said bar being quite rapid, it follows that the reciprocation or oscillation of said rock-shaft and the arms thereto attached is rapid. And motion is transmitted from said bar to one of said arms, and the other of said arms is relatively long, so that the movement of its outer end is more rapid than is the movement of the outer end of the first arm. Hence the quick movement transmitted from said bar to the first or relatively short arm is augmented or intensified in the second or relatively long arm.

Behind the upper part of the main or primary bar, 15, is a bar, 31, having at its upper end a forward-directed arm, 32, screwed to the right hand side of the bar, 15, and having its lower end secured to the right hand side of the lug, 18, by means of a screw, 33, passing through two forward directed ears, 34, and a tripping member consisting of a bell-crank, 35, the latter being loose upon said screw and having an upper arm normally bearing against the bar, 31, and having a lower arm directed forward and downward, so that downward pressure upon said lower arm will tilt said bell-crank while upward pressure on said arm will cause the upper arm to bear against the bar, 31, and prevent the tilting of said bell-crank. A contracting coiled spring, 36, is applied by one end to the lower arm of the bell-crank and by its other end to the main bar, 15, and normally tilts said bell-crank so as to cause its upper arm to bear against the bar, 31. The reciprocation of the bar, 15, causes the bell-crank to move bodily up and down in a direction parallel to the movement of the bar, 15. In the path of the lower arm of said bell-crank is a horizontal wrist, 37, on a short arm, 38, which is rigid on one end of the horizontal rock-shaft, 39, resting in bearings, 40. On the other end of said rock-shaft is a relatively long rigid arm, 41. Around said rock-shaft is a torsion spring, 42, secured to one of the adjacent bearings and to said shaft in proper relation to tend to turn the front portion of said shaft upward so as to press the arm, 41, rearward toward the base, 1. Said spring is a constantly acting means tending to turn the rock-shaft in one direction. At a suitable distance above the bell-crank, 35, the bar, 31, has an offset portion, 43. When the main or primary bar, 15, is moved upward, the forward arm of the bell-crank, 35, bears against the wrist, 37, and is pressed downward until it has passed said wrist, and then immediately, through the action of the spring, 36, assumes its normal position. Then on the downward movement of the bar, 15, said arm of the bell-crank bears unyieldingly against said wrist and forces the latter downward, the wrist slipping rearward over the lower edge of said arm and the lower edge of the adjacent ear, 34, and then along the rear face of the bar, 31, until the offset portion, 43, is reached. Then, in response to the action of the torsion spring, 42, the arm, 38, and said wrist are thrown forward. During such rearward and forward movement of said wrist, the relatively long arm, 41, of the rock-shaft moves in opposing directions.

On the arm, 41, are two metallic contact plates, 44, separated from said arm by insulation pieces, 45, and connected with each other by a conductor, 46. On the base, 1, is a stationary metallic contact plate or finger, 47, insulated from the base (if the latter is not a non-conductor) and adapted to make contact with the lower plate, 44. And above the plate, 47, is a similar plate, 48, adapted to make contact with the upper plate, 44, when the arm, 41, is in its rear position. From the plate, 47, an insulated electric conductor, 49, leads to a switch, 50, and from the plate 48, a conductor, 51, leads to an incandescent lamp socket, 52. (See Fig. 15). From said lamp socket a conductor, 53, leads to a source of electric current supply, 54. A conductor, 55, leads from the switch, 50, to a source of electric current supply, 54. A conductor, 56, leads from the motor, 2, through the conductor, 55, to the source of electric current supply, 54; and the conductor, 57, leads from the motor to the switch, 58, and from said switch a conductor, 59ª, leads to the other side of the source of supply, 54, via the conductor, 53.

On closing the switch, 58, the motor, 2, is set into action; and on closing the switch, 50, the circuit is closed through the incandescent electric lamp, 52, it being remembered that the rock-shaft arm, 41, bearing the contact plates, 44, 44, is by the spring, 42, normally held in its rearmost position so that said plates bear against the plates, 47 and 48. Thus the lamp, 52, is in operation and so continues until the circuit upon which the lamp is located is broken by the oscillation of the rock-shaft, 39, and the movement of the arm, 41, forward away from the base, 1. Said lamp, 52, and the lamp, 92, hereinafter described, are used herein to facilitate description of the driving mechanism with reference to the main electric circuit upon which the switch mechanisms herein described are located. In practice, said lamps may or may not be associated with the driving mechanism as illustrated by the drawings. If so desired, they may be placed for convenient observation during the operation of the apparatus, their changes from light to darkness and vice versa indicating the operation of the rock-shaft switch mechanism and the supply of electric current from whatever source of supply such current is taken.

For the oscillation of the rock-shaft, 39, and the arms, 38 and 41, to move said contact plates, 44, so that contact is broken between at least the upper plate, 44, and the plate, 47, the primary bar, 15, is drawn upward by the mutilated gear, 13, until the bell-crank, 35, has passed the wrist, 37, on the arm, 38, said wrist remaining stationary. Then the release of the bar, 15, from said mutilated gear allows said bar to move downward and, by means of the bell-crank, 35, and the right hand ear, 34, press said wrist and the arm, 38, downward and rearward, whereby the rock-shaft, 39, and the long arm, 41, bearing the plates, 44, are correspondingly turned. As soon as the wrist, 37, reaches the offset portion, 43, on the bar, 31, said rock-shaft and the arms (and said wrist) supported thereby turn in the reverse direction in response to the strain of the torsion spring, 42, thus again bringing the plates, 44, into contact with the companion plates, 47 and 48. Such oscillation of said rock-shaft and its arms is repeated indefinitely as long as the motor, 2, is in operation; and such operation may at any time be suspended by opening the switch, 58. And the operation of the lamp, 52, may be at any time suspended by opening the switch, 50. And during such times as both of said switches are closed, said light will be extinguished periodically for a relatively short period, the ratio of the period of illumination being to the period of darkness as the time required for the lifting of the bar, 15, is to the time required for the fall of said bar through a distance equal to the distance from approximately the middle portion of the forward arm of the bell-crank, 35, to the offset portion, 43, of the bar, 31. Inasmuch as the upward movement of said bar is slow and the greater portion of the fall thereof is rapid, it will be seen that the period of illumination is much longer than the period of darkness. In other words, the period of work is longer than the period of interruption. But, it is to be observed, that these two intervals may be reversed, the short interval being taken for the work and the long interval being taken for the interruption. And the relative lengths of these intervals or periods may be changed.

The apparatus illustrated by the drawings includes members for dividing the transmitted motion to perform two separate operations, namely, to control the lamp circuit already described and to control another similar lamp circuit, the lamps on the second circuit to be in operation for the same or for longer intervals than the lamps of the first and the intervals of darkness to be simultaneous.

Parallel to and at the side of the primary bar, 15, is a secondary bar, 60, and said bar, 60, is held slidably in the supports, 16 and 17. And the lower end of said bar extends into a dash-pot, 62, and therein supports a piston, 61, corresponding to the piston, 23, in the dash-pot, 22. Said dash-pot, 62, is supported in a ring, 59, the same as the dash-pot, 22, is supported in the ring, 21. The lower end of the dash-pot, 62, has a tube, 63, and in said tube is a channeled vent screw, 64, like the screw, 26, in the tube, 25, of the dash-pot, 22. A link, 65, like the link, 29, is secured to the bar, 60, and a chain, 66, is applied to said link and is placed in operative relation with a weight, W, as above described in connection with the link, 29. The bar, 60, bears a lug, 57$^a$, (like the lug, 18, on the bar, 15,) and a screw, 58$^a$, in the bracket, 20, forms an adjustable stop or abutment for said lug. To the upper portion of said bar, 60, is applied a bar, 67, having at its upper end an arm, 68, and at its lower end a screw, 68$^a$, ears, 69, bell-crank, 70, and contracting coiled spring, 71, respectively like the members, 31 to 36, inclusive, on the bar, 15. But the bar, 60, has no gear rack like the gear rack, 14, on the primary bar. For lifting the secondary bar, it is temporarily engaged with the primary bar by means of a hook lever, 72, pivoted upon the upper end of the secondary bar by a horizontal screw or post, 73, extending loosely through said lever into said bar. Said hook lever has a slanting lateral extension, 74, adapted to extend into the path of a block, 75, on the adjacent end of the primary bar. An electro-magnet, 76, is located opposite the lower end of the path of the lower end of said hook lever and the energizing of said magnet tilts said lever so as to bring the lateral extension, 74, into the path of the block, 75, when the primary and secondary bars are in their lowermost positions. The screws, 19 and 58$^a$, are so set as to allow the primary bar to descend slightly after the secondary bar has been stopped, in order that the lateral extension, 74, may be put out of engagement with the block, 75. A contracting coiled spring, 77 is secured by one end to the lower end of said hook lever and by its other end to the secondary bar in such manner as to cause said spring to draw said end of said lever away from the magnet, 76, when the latter is deenergized. When said magnet is inactive, the primary bar reciprocates entirely independently of the secondary bar, the latter remaining at rest; but as soon as said magnet is energized (while the primary bar is going toward its lower limit), the hook lever is turned so as to bring the extension, 74, into the path of the block, 75 (which in passing down pushes said extension aside); and then the next upward movement of the primary bar will cause the simultaneous upward movement of the secondary bar.

Adjacent the secondary bar is a wrist, 78, on an arm, 79, which is on a rock-shaft, 80, resting in bearings, 81, and having an arm, 82, and being surrounded by a torsion spring, 83, all corresponding, respectively, to the members, 37 to 42, inclusive, adjacent the primary bar. And the bar, 67, has an offset portion, 84, like the offset portion, 43, on the bar, 31; and the arm, 82, bears contact plates, 85, like the contact plates, 44, on the arm, 41; and insulation plates, 86, which are like the insulation plates, 45, separate the plates, 85, from the arm, 82; and an electric conductor, 87, connects the plates, 85; and beside the arm, 82, are two plates, 88 and 89, corresponding to the plates, 47 and 48. A conductor, 90, leads from the plate, 88, to the switch, 50, and a conductor, 91, leads from the plate, 89, to an incandescent electric lamp socket, 92, and a conductor, 93, leads (via conductor), 53, from said lamp to the source of electric current supply, 54. (See Fig. 15.) The conductor, 55, already described, leads from said source of supply to the switch, 50. And a conductor, 94, leads from a source of current supply, 54, to said magnet and thence to the switch mechanism to be hereinafter described.

Referring now to the diagram, Fig. 16, 110, 110, etc., are electric conductors on which electric lamps, 111, are to be put into and out of operation by the closing and breaking of the circuits at chosen points, as, for example, points, 112. A conductor 114, which is a continuation of the conductor, 53, from the lamp, 52, in Fig. 15, leads to the conductors, 110, 110, adjacent said lamps, 111, and a conductor, 115, leads from the opposite ends of said conductors, 110, to the conductor, 51, at or near the lamp, 52. The problem is to simultaneously close or break the circuit on any group, consisting of any number, of said conductors, 110, 110, etc. For this purpose I use a rotary cylinder having separated portions of its perimeter faced with metal, and a series of brushes each of which is in electrical communication with one of the conductors, 110, and bears upon the perimeter of said cylinder, and the metallic portions of said cylinder being successively made part of the conductor, 115— the part which stands opposite the ends of the conductors, 110, 110.

Referring next to Figs. 1, 2, 3, 16, 17, 19, and 20, 116 is the base upon which the cylinder, C, is supported, said cylinder being secured around the shaft, 117, the lower end of which rests in the bearing, 118, in the lower horizontal portion of a frame, 120, (Fig. 20) while the upper end of said shaft rests in a bearing, 119, in the upper portion of said frame, said bearing, 119, being in a tube, 121, extending through an opening, 122, in the upper portion of the frame, 120, and held in such opening by a flange, 123. (See Fig. 18.) Said tube is preferably extended below the opening, 122, and the shaft, 117, made short enough to extend only into the portion of the tube which is below said opening, in order that when the tube is drawn upward, the upper end of the shaft and the cylinder may be moved sidewise until they clear the hub around the openings, 122. Then the cylinder may be lifted until the shaft, 117, is above the bearing, 118. Then the cylinder may be moved sidewise for removal from the apparatus.

The base, 116, rests on two horizontal arms, B¹, extending horizontally from a rectangular upright or suspension frame, B, which is supported on two horizontal supporting members, as cables. D, D, stretched from one post, A, to the other. Each such rectangular frame forms a support for a chosen number of incandescent lamps constituting a light field in which field various representations, as, for example, letters and figures, are successively formed by lighting appropriately located lamps in said field.

In the form shown in the drawings, the body of the cylinder, C, is tubular and composed of radial wooden strips, 124, lying against each other flatwise and secured to each other by glue. At its lower end said wooden tube rests upon and is secured rigidly to a circular metallic bottom plate, 125, having a hub, 126, extending around the shaft, 117. A set-screw, 127, extends through said hub and bears against said shaft for immovably binding said hub and the plate, 125, to the shaft. The plate, 125, has on its circumference equally-spaced ratchet teeth, 128. At its upper end the tubular body of the cylinder is immovably secured to a similar circular metallic plate, 129, having a hub, 130, surrounding the shaft, 117, and penetrated by a set-screw, 131, which serves to bind said hub and said plate to said shaft. But the top plate, 129, does not have ratchet teeth as shown on the bottom plate, 125.

A step-by-step rotary motion is imparted to the cylinder, C, by means of a pawl, 132, set for engagement with the teeth, 128, of the bottom plate, 125. Said pawl is supported upon a horizontal arm, 133, located immediately below said bottom plate and secured rigidly to the upper end of a rock-shaft, 134, which extends downward through a bearing, 135, in the lower horizontal portion of the frame, 120, said frame having at this place a downward extension, 136, into the base, 116. The arm, 133, rests upon the adjacent portion of the frame, 120, and thus holds the shaft, 134, against downward movement. At its lower end, and at the side opposite the arm, 133, the shaft, 134, supports an arm, 137, on which is an anti-friction roller, 138. By moving said arm, 137, toward the left, as viewed in Fig. 19, the arm, 133, is turned toward the right and made to press the pawl, 132, against the teeth, 128, of the bottom plate, 125. One end of a contracting coiled spring, 139, is secured to the pawl, 132, and the other end of said spring is secured to the arm, 133, and draws the pawl toward said teeth. Adjacent the arm, 133, is a post, 140, bearing an adjusting screw, 141, in the path of the arm, 133. By varying the position of said screw, the limit of travel of the arm, 133, and the pawl in the direction of said post may be varied. The teeth, 128, of said bottom plate are spaced the same and correspond in number to the wooden strips, 124, forming the tubular body of the cylinder.

The arm, 137, is operated by mechanism to be next described. From the lower horizontal portion of the frame, 120, downward extensions, 142, project through the base, 116, and form horizontal bearings for a horizontal reciprocatory bar, 143, guiding said bar in fixed relation to the cylinder. Said bar is connected by one end with the chain, 66, after the latter passes the guide roller, 144. From the opposite end of said bar a chain, 145, leads over a guide roller, 146; and to the free end of said chain is attached a weight, 147, which constantly draws on said chains and bar and through the chain, 66, on the primary bar, 15. A cam bar, 148, is secured rigidly to the face of the bar, 143, which is directed toward the arm, 137, and is adapted to bear against the anti-friction roller, 138, said cam bar being between the anti-friction roller, 138, and the guide roller, 144, excepting when the primary bar, 15, of the driving mechanism is in its position of rest. Then the cam bar is between the roller, 138, and the bar, 143, the roller having been pushed sidewise. When the bar, 143, moves away from the roller, 144, after the release of the primary bar, 15, the cam bar, 148, forces the arm, 137, in the same direction and sidewise. Said cam bar is made with a face which is parallel to the bar, 143, and long enough to remain in engagement with the roller, 138, during the reciprocation of the bar, 143, after the roller has been pushed sidewise the desired distance. When the bar, 143, returns toward the roller, 144, the arm, 137, is made free to return in the same direction and toward the bar, 143. Such movement is compelled by the contracting coiled spring, 149, having one end secured to the arm, 133, and the other to an ear, 150, on the adjacent upright portion of the frame, 120.

The outer edge of each of the wooden cylinder strips, 124, bears an upright dove-tail or rib, 151, extending the full length of such strip. Said dove-tails or ribs are designed to receive interchangeably metallic channel-form, mutilated conductor bars, 152, which are dove-tail in cross section and are of the same length as said wooden strips. Portions of the middle wall of each such bar are cut away to form openings, 153, at intervals to expose the surface of the wooden strip.

Opposite the cylinder, on the inner face of the upright portion of the frame, 120, is a strip of insulation material, 154, extending the entire length of said portion of said frame. Against said insulation rest horizontal brushes, 155, having their free ends bearing against the dove-tail portions of the strips, 124, or against the channel bars, 152, depending upon whether an opening, 153, is at the time opposite the end of said brush. Next to each brush is a block of insulation, 156; and next to said block is a metallic or other washer or binding plate, 157; and a screw, 158, extends through said washer and insulation blocks into said portion of said frame. The brushes are the same in number as the conductors, 110; and it may be said that each such brush constitutes a part of said conductor, and that the channel-form conductor bar at the time opposite the free ends of said brushes is a part of the conductor, 115, leading from the source of current, 54. This relation is shown in diagram by Fig. 24. In addition to the brushes required for the conductors, 110, a feed brush, 159, is applied to the frame, 120, below the lowermost brush 155, in position to have its free end bear against the lower portion of the middle wall of the conductor bars, said brush being secured the same as the brushes, 155. The conductor, 115, leads to said brush. And above the brushes, 155, is another brush, 160, connected with a conductor, 94, leading to the magnet, 76, located as above described, adjacent the secondary bar, 60, and thence to the conductor, 53. In the conductor bars the openings, 153, are so placed as to come opposite the brushes of the conductors, 110, which are to have the circuit broken at the time the conductor bar and the corresponding dove-tail extension are opposite the free ends of the brushes. In Fig. 24 the uppermost two brushes, 155, rest upon the conductor bar and the circuit of the corresponding two conductors, 110, is consequently closed, and the lights, 111, on said circuits are in operation. The next two brushes bear on the wood of the cylinder and the corresponding conductors, 110, are open and the lights, 111, located thereon are dark. Then three more brushes make contact with the conductor bar, whereby three more lamps are put into operation; and so on. The lower portions of the middle walls of all the conductor bars are left intact, so that all of said bars will make contact with the feed brush, 159. For the magnet circuit brush, 160, said middle wall of the channel bars is cut away on portions of said bars according to the intervals of operation desired for the secondary bar, 60, when the latter is used. But the use of said bar need not be considered at this time.

The conductor bars, 152, are varied as to the openings, 153, to make any desired combination or grouping of the lamps, 111; and said bars may be removed (by pushing them upward) and replaced by other bars having a different group of the openings, 153. The lower ends of said bars are separated from the bottom plate, 125, by small insulation blocks, 161, resting on said plate between the dove-tails, 151, of the wooden strips, 124. The portions cut out of the conductor bars to form the openings, 153, make said bars mutilated.

If the lamps, 111, are arranged to represent any one of a series of chosen devices or characters, as, for example, figures or letters, each conductor bar may be appropriately formed to cause the illumination of the required lamps, 111; so that as the cylinder, C, rotates step-by-step, first one and then another of such devices or characters will be formed by said lamps. And, in like manner, any devices substituted for the lamps, 111, may be brought into operation in groups. Two or more such switch mechanisms may be placed side by side and the bar, 143, extended to operate the pawl, 132, on both or all such mechanisms. But it will usually be preferable to use as many such bars as there are switch mechanisms and connect the adjacent ends of said bars with links, 162, said bars and said links together constituting a non-rigid, power-transmitting, tension member adapted to conform to irregularity in alinement of the extensions, 142, in which said bars are slidably supported. And it is preferable to provide for successive, instead of simultaneous, engagement of the arm, 137, by the adjacent cam bars, 148, in order that the power required for operating the several arms, 137, may not be aggregated. For this purpose, the cam bars may be so placed upon the bars, 143, as to bring first one and then another of the arms, 137, into engagement with the sloping portion of the adjacent cam bar. For practical purposes, only a slight difference in the spacing of said cam bars with reference to the adjacent arm, 137, will produce an effective successive engagement of the arms, 137. But, notwithstanding such successive engagement of the arms, 137, the movement of the cylinders may be regarded as practically in unison; for each moves during the one reciprocation of the tension member and the one tension member may thus move an indefinite number of such cylinders. And such cylinders are thus connected through said tension member with one driving mechanism for simultaneous and equal step-by-step rotary movement.

The transmitting tension member does not pull directly on the arm, 137. That is to say, the action of said tension member on said arm is not parallel to the length of said tension member but crosswise of said member. If such action were parallel to the length of said tension member, variation in the length of said member due to thermal expansion and contraction and to stretching through strain and to change in the relative position of the arm, 137, and the bar, 15, of the driving mechanism would change the distance through which the arm, 137, would be moved. But the movement of said arm is effected by utilizing the width of the tension member (the bar, 143, plus the cam bar, 148). This crosswise dimension is so short that thermal expansion and contraction therein is so small as to be immaterial in operation; and said bars, 143 and 148, are themselves so rigid and so rigidly secured to each other as to make accidental change in adjustment impossible. And each cam bar has a face which is parallel to the bar, 143, and which may move along the arm, 137, any distance without changing the position of the arm. This allows a movement of the tension member farther than is needed to move any particular arm without increasing the movement of the arm, and this makes possible the taking of the loads for the different cylinders successively. This also permits an inaccurate or only approximately precise lengthwise adjustment of the tension member. Two such switch mechanisms may be arranged for use partially independently of each other, one controlled and driven by means of a bar, 143, controlled by the primary bar, 15, of the driving mechanism, and the other being driven by a bar, 143, controlled by the secondary bar, 60, and the conductors, 114 and 115, of the second mechanism lead respectively, from the conductors, 93 and 91. This latter switch mechanism may be termed a secondary switch mechanism. Inasmuch as the secondary bar, 60, is actuated only when said bar is engaged with the primary bar, 15, through the hook lever 72, it follows that ordinarily the secondary switch mechanism is operated at longer intervals than the intervals of operation of the primary switch mechanism. The hook lever, 72, being under the control of the magnet, 76, said hook lever is put into action whenever said magnet is energized. This occurs as often as contact is made between the brush, 160, and a conductor bar, 152. Thus the operation of the secondary switch mechanism is put under the control of the primary switch mechanism. When it is desired to turn the cylinder of the secondary switch mechanism through one step simultaneously with the similar movement of the cylinder of the primary switch mechanism, the middle wall of the conductor bar, 152, is left intact in the line of the brush, 160. Thus the field of lamps directly controlled by the primary switch mechanism may be changed several times while the lamps controlled by the secondary switch mechanism remain unchanged. This adapts the apparatus to the forming of a word or group of words by means of a row of secondary switch mechanisms and the lamps controlled thereby and leaving such words or groups of words stand while with a row of primary switch mechanisms and their lamps other words or groups of words are successively made. The words or groups of words so formed by the secondary mechanisms and their lamps may be a title or headline for the matter to which the words formed by the primary mechanisms and their lamps relate.

When a plurality of secondary switch mechanisms are used as above described, the bar, 143, may extend from one to the other for their simultaneous operation, as has been described regarding the plurality of secondary switch mechanisms. And whenever a plurality of primary switch mechanisms are thus associated, the magnet, 76, need be placed in operative relation with only one of the primary switch mechanisms by means of the brush, 160; for the temporary joining of the secondary bar, 60, to the primary bar, 15, serves all of the secondary switch mechanisms.

It is to be observed that before each movement of the cylinder leading to the breaking of the circuits by the moving of one of the conductor bars away from the brushes, the circuit is broken by the quick separation of the contact plates, 44, from the plates, 47 and 48, in the driving mechanism. This insures the instantaneous extinguishing of all of the lamps of the several light fields and also prevents injury to the brushes and conductor bars from arcing when said bars leave said brushes. And it will be noted that the lamp, 52, is not controlled by the rotary switch mechanism, but only by the rock-shaft switch of the driving mechanism.

The tension member comprising the bars, 143, and links, 162, may, for convenience, be termed a laterally "conformable" tension member, said member being conformable laterally to variation in alinement of the several switch mechanisms. But said tension member is not elastic or extensible lengthwise. Hence the term "laterally conformable tension member," when used herein, means such a tension member substantially non-extensible lengthwise, but adapted to yield laterally out of true alinement.

I claim as my invention:

1. In an apparatus of the nature described, the combination of two switch mechanisms, a driving mechanism, and two transmission members each in operative relation with one of the switch mechanisms and with the driving mechanism and providing means for causing action after time periods differing in duration from the time periods after which the other transmission member is actuated, and the operative relation of the transmission member which operates after time periods of the longer duration producing action after periods of varying duration, substantially as described.

2. In an apparatus of the nature described, the combination of a switch mechanism comprising a rotary cylinder, a tension member bearing a cam, a pawl and ratchet mechanism in operative relation with said cylinder and with said tension member for action crosswise of said tension member, and means for actuating said tension member, substantially as described.

3. In an apparatus of the nature described, the combination of a plurality of switch mechanisms each comprising a rotary cylinder, a tension member bearing cams, pawl and ratchet mechanisms in operative relation with said cylinders and with said tension member for action crosswise of said tension member, and means for actuating said tension member, substantially as described.

4. In apparatus of the nature described, the combination of a plurality of switch mechanisms each comprising a rotary cylinder, a flexible tension member bearing cams, pawl and ratchet mechanisms in operative relation with said cylinders and with said tension member for action crosswise of said tension member, and means for actuating said tension member, substantially as described.

5. In an apparatus of the nature described, the combination of two switch mechanisms each comprising a rotary cylinder, two flexible tension members each bearing a cam, one of said tension members leading to one of said switch mechanisms and the other leading to the other of said switch mechanisms, a pawl and ratchet mechanism in operative relation with each adjacent cylinder and each adjacent tension member for action crosswise of said tension member, and means for actuating said tension members on diverse timing, substantially as described.

6. In an apparatus of the nature described, the combination of a switch mechanism comprising a rotary cylinder, a tension member bearing a cam, means for guiding said tension member in fixed relation to said cylinder, a pawl and ratchet mechanism in operative relation with said cylinder and with said tension member for action crosswise of said tension member, and means for actuating said tension member, substantially as described.

7. In an apparatus of the nature described, the combination of a plurality of switch mechanisms each comprising a rotary cylinder, a flexible tension member bearing cams, means for guiding said tension member in fixed relation to said cylinders, pawl and ratchet mechanisms in operative relation with said cylinders and with said tension member for action crosswise of said tension member, and means for actuating said tension member, substantially as described.

8. In an apparatus of the nature described, the combination of two switch mechanisms each comprising a rotary cylinder two flexible tension members each bearing a cam, one of said tension members leading to one of said switch mechanisms and the other leading to the other of said switch mechanisms, means for guiding said tension members in fixed relation to said cylinders, a pawl and ratchet mechanism in operative relation with each adjacent cylinder and each adjacent tension member for action crosswise of said tension member, and means for actuating said tension members on diverse timing, substantially as described.

9. In an apparatus of the nature described, the combination of a switch mechanism comprising a cylinder, non-conducting dove-tail ribs on said cylinder, mutilated conductor bars removably dove-tailed to said ribs, a series of brushes arranged to bear upon said cylinder, electrical conductors leading to said brushes, driving mechanism, and mechanism in operative relation with said driving mechanism and with said cylinder for imparting a step-by-step rotation to said cylinder, substantially as described.

10. In an apparatus of the nature described, the combination of a switch mechanism comprising a rotary cylinder, a tension member bearing a cam, motion transmitting mechanism in operative relation with said cylinder and with said tension member for action crosswise of said tension member, and means for actuating said tension member, substantially as described.

11. In an apparatus of the nature described, the combination of a switch mechanism comprising a cylinder, non-conducting ribs on said cylinder, mutilated conductor bars removably applied to said ribs, a series of brushes arranged to bear upon said cylinder, electric conductors leading to said brushes, driving mechanism, and mechanism in operative relation with said driving mechanism and with said cylinder for imparting a step-by-step rotation to said cylinder, substantially as described.

12. In an apparatus of the nature described, the combination of a switch mechanism comprising a cylinder, non-conducting ribs on said cylinder, mutilated conductor bars removably dove-tailed to said ribs, a series of brushes arranged to bear upon said cylinder, electric conductors leading to said brushes, driving mechanism, and mechanism in operative relation with said driving mechanism and with said cylinder for imparting step-by-step rotation to said cylinder, substantially as described.

13. In an apparatus of the nature described, the combination of a switch mechanism comprising a cylinder built of non-conducting segments having ribs, mutilated grooved conductor bars removably applied to said ribs, a series of brushes arranged to bear upon said cylinder, electric conductors leading to said brushes, driving mechanism, and mechanism in operative relation with said cylinder for imparting a step-by-step rotation to said cylinder, substantially as described.

14. In an apparatus of the nature described, the combination of a switch mechanism comprising a cylinder having longitudinal channels in its perimeter, conductor bars each having a portion extending into one of said channels, and having a mutilated portion resting upon the perimeter of the cylinder adjacent said channel, substantially as described.

15. In an apparatus of the nature described, the combination of a switch mechanism comprising a cylinder, non-conducting ribs on said cylinder, conductor bars on said ribs, each such bar extending over the outer face and alongside of said rib, and said bar having openings across the outer face and over a portion of the side of the rib, substantially as described.

16. In an apparatus of the nature described, the combination of a plurality of multiple, rotary switches, relatively distant power mechanism, and a longitudinally reciprocable tension member in operative relation with each of said switches and with said power mechanism, substantially as described.

17. In an apparatus of the nature described, the combination of a plurality of multiple, rotary switches, relatively distant power mechanism, and a longitudinally reciprocable flexible tension member in operative relation with each of said switches and with said power mechanism, substantially as described.

In testimony whereof I have signed my name, in presence of two witnesses, this 6th day of March, in the year one thousand nine hundred and eleven.

JAMES B. LEE.

Witnesses:
  CYRUS KEHR,
  W. W. LEE.

Copies of this patent may be obtained for five cents each, by addressing the "Commissioner of Patents, Washington, D. C."